United States Patent [19]
Teekell et al.

[11] Patent Number: 5,109,576
[45] Date of Patent: May 5, 1992

[54] CLOSURE DEVICE

[76] Inventors: Gordon E. Teekell, 8809 Skyline Blvd., Oakland, Calif. 94611; Siegfried Liebthal, 1013 Holly St., Alameda, Calif. 94501

[21] Appl. No.: 690,753

[22] Filed: Apr. 24, 1991

[51] Int. Cl.⁵ .............................................. B65D 77/10
[52] U.S. Cl. .............................. 24/30.5 R; 24/30.5 P; 24/559
[58] Field of Search ........... 24/30.5 R, 30.5 P, 30.5 S, 24/517, 559, 570, 571; 248/205.3

[56] References Cited

U.S. PATENT DOCUMENTS

| | | |
|---|---|---|
| 1,201,045 | 10/1916 | Head . |
| 3,094,807 | 6/1963 | Dorman . |
| 3,323,208 | 6/1967 | Hurley, Jr. . |
| 3,461,876 | 9/1966 | Miller, Jr. . |
| 3,516,631 | 6/1970 | Santucci ............................ 248/205.3 |
| 3,561,077 | 2/1971 | Grant ................................ 248/205.3 |
| 3,612,475 | 10/1971 | Dinger . |
| 3,621,539 | 11/1971 | Ayers ................................ 24/30.5 R |
| 3,713,622 | 1/1973 | Dinger . |
| 3,900,989 | 8/1975 | Weisenthal . |
| 4,193,174 | 3/1980 | Stephens . |
| 4,227,730 | 10/1980 | Alexander et al. . |
| 4,277,863 | 7/1981 | Faneuf . |
| 4,279,064 | 7/1981 | Simme . |
| 4,380,103 | 4/1983 | McGrath et al. ................. 24/30.5 P |
| 4,534,089 | 8/1985 | Swan ..................................... 24/559 |
| 4,646,394 | 3/1987 | Krauss ............................... 24/30.5 S |
| 4,648,178 | 3/1987 | McGrath . |
| 4,866,818 | 9/1989 | Thompson ....................... 24/30.5 P |
| 4,926,526 | 5/1990 | Brown et al. ..................... 24/30.5 R |

FOREIGN PATENT DOCUMENTS 0156779 10/1985 European Pat. Off. ......... 24/30.5 R
2732326 8/1979 Fed. Rep. of Germany .

Primary Examiner—Victor N. Sakran
Attorney, Agent, or Firm—Townsend and Townsend

[57] ABSTRACT

A reusable closure device for closing and sealing flexible objects such as plastic tubes or bags, balloons or similar articles which has unitary construction, is lightweight, and is resilient. The clip has two arms connected by a curved hinge portion which allows the two arms to pivot or bend relative to one another. The first arm has a bulged free end with a concave recessed channel. The second arm is formed having a tapered, linear first section and a curved second section, the two sections separated by an angled junction region having an edge. The second section is curved forming a flanged portion for receiving the bulged free end of the first arm and has an outwardly extending lever on its outer surface. An article to be sealed is inserted between the first arm and second arm and the first arm and second arm are squeezed together until the bulged free end of the first arm snaps into the flanged portion of the second arm and is secured into a closed position by a lip which engages with a concave recessed channel of the first arm. The edge formed on the second arm helps to pinch and retain the article being sealed against the inside wall of the first arm. To open the closure device, force is applied to the lever of the second arm which deflects the flanged portion and releases the free end of the first arm to allow the closure device to return to the open, unbiased position. The device can be easily and repetitively opened and reclosed without altering the effectiveness of the closure seal created by the device in the closed position.

10 Claims, 2 Drawing Sheets

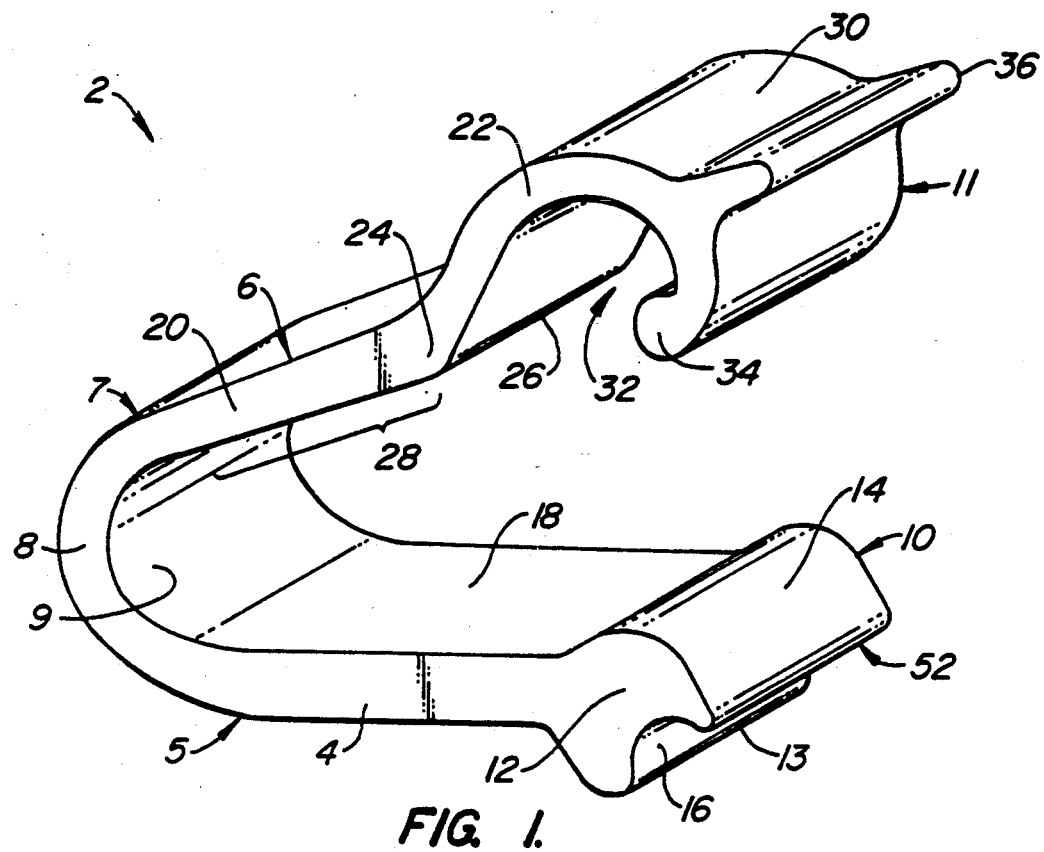
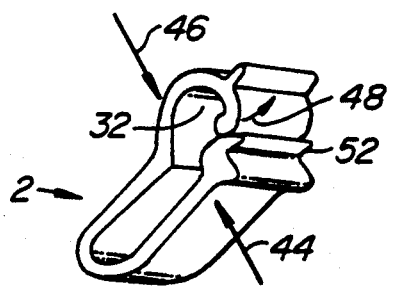
FIG. 2.
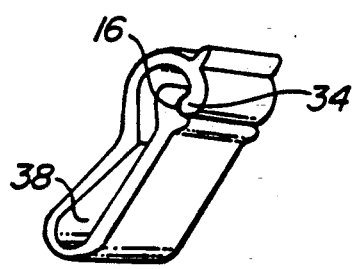
FIG. 3.
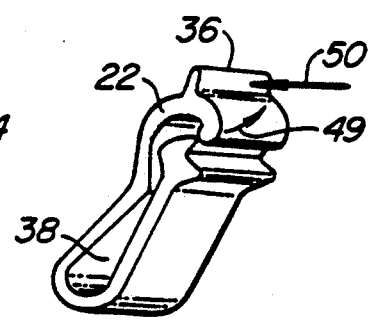
FIG. 4.
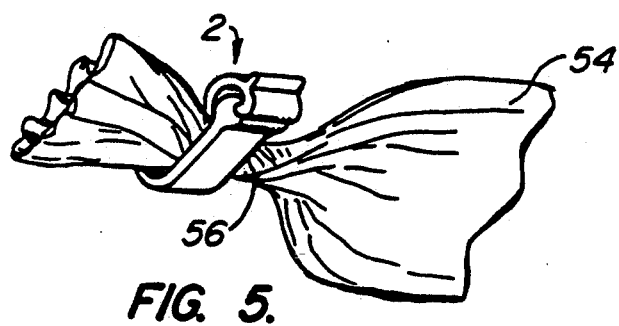
FIG. 5.

CLOSURE DEVICE

BACKGROUND OF THE INVENTION

The invention relates to a reusable, resilient closure device for sealing non-rigid articles such as balloons, plastic bags, flexible tubing or similar articles.

Resilient closure devices, or clips, for the closure and sealing of balloons, resilient tubing or bags must not only provide a secure clamping action to seal the article, but they must be of simple construction, lightweight and preferably be capable of being manufactured at a low cost. The device must provide a secure seal which locks into place. However, many prior art devices which incorporate a simplistic design to facilitate low manufacturing cost and light weight lack the capability of being easily fastened and unfastened between a closed and opened position. Conversely, some closure devices which can be opened from a closed position, lack simplicity or are more expensive to manufacture. Therefore, there is a need for a simple, low cost and lightweight resilient closure device which can be used to seal a wide range of articles such as the necks of inflated balloons, the open ends of newspaper bags or bulk packaged products and the like while allowing the device to be easily opened from the closed position by the user.

Such a closure device should provide a firm watertight seal and hold securely in the locked position while being easy to open into an unlocked position without utilizing any special tools or excessive force. The device should be capable of being manufactured at a low cost, using techniques such as injection molding or extrusion molding, have high durability and be reusable. Herein is described such a device.

SUMMARY OF THE INVENTION

The invention is a closure device for closing and sealing non-rigid objects such as plastic tubes or bags, balloons or similar articles which has unitary construction, is lightweight, and is reusable.

The invention has two arms connected by a curved hinge portion which allows the two arms to pivot or bend relative to one another. The first arm has a bulged free end with a concave recessed channel. The second arm is formed having a first and second section separated by an angled junction region forming an edge. The first section of the second arm is tapered and the second section is curved forming a flanged portion and having an outwardly extending lever on its outer surface.

The invention has a natural, unbiased position where the arms angle away from each other forming an open position. To move the device from the open position to the closed position, the first arm and second arm are squeezed together until the bulged free end of the first arm snaps or clips into the flanged portion of the second arm. The bulged free end of the first arm is secured into a closed position by a lip formed on the second section of the second arm which engages with the concave recessed channel of the first arm. The edge formed between the first section and second section of the second arm helps to pinch and retain the article being sealed against the inside wall of the first arm.

To open the closure device from the closed position, force is applied to the lever of the second arm to deflect the flanged portion and release the free end of the first arm, thereby allowing the closure device to return to the open, unbiased position. The device can be easily and repetitively opened and reclosed without compromising the secure closure seal.

The tapered portion of the second arm and the angled junction region of the second arm combine to provide a solid clamping mechanism. The edge formed between the first section and second section faces the inside surfaces of the second arm and pinches the article being sealed between the first arm and second arm when the closure device is in the closed position.

The device can be easily manufactured from a resilient plastic which provides enhanced durability and light weight. The closure device can be made translucent or in a wide variety of opaque colors selected to enhance the aesthetic appearance of the closure device or to match the color of the structure being sealed. The color may also be selected for implementation of a color coding scheme to contrast or distinguish between various sizes or uses.

The simple construction and light weight of the closure device makes it ideal for applications such as sealing inflated helium balloons, plastic bags for protecting newspapers and such from rain or moisture, or for sealing various food container bags and the like. The closure device can be manufactured in a wide range of sizes suitable for the particular application contemplated.

BRIEF DESCRIPTION OF THE DRAWINGS

FIG. 1 is a perspective view of the invention showing the closure device in the natural, unbiased open position;

FIG. 2 is a perspective view of the closure device shown in FIG. 1 being positioned from the open position to a closed position;

FIG. 3 is a perspective view of the closure device shown in FIG. 1 secured in the fully closed position;

FIG. 4 is a perspective view of the closure device shown in FIG. 1 with an arrow indicating where force is to be applied to disengage the closure device from the closed position to allow it to return to its open, natural unbiased and open position;

FIG. 5 is a perspective view of the invention secured about a plastic bag to provide a secure seal which resists moisture from passing through the seal zone;

DESCRIPTION OF THE PREFERRED EMBODIMENT

Figure 6:
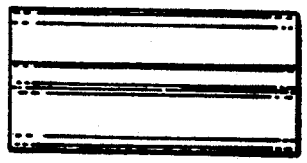
FIG. 6 is a top view of the invention shown in the closed position.
Figure 7:
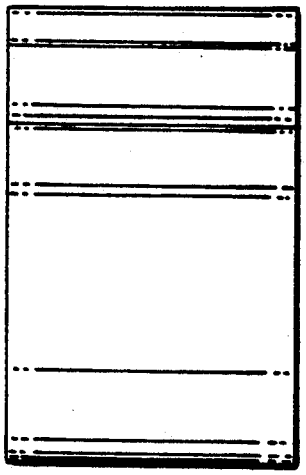
FIG. 7 is a front view of the invention shown in the closed position.
Figure 9:
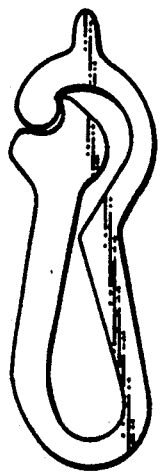
FIG. 9 is a side view of the invention shown in the closed position, each side being consistent in configuration.
Figure 8:
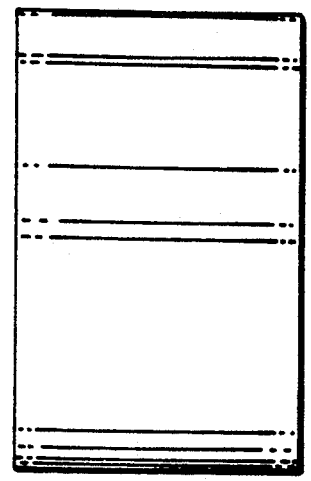
FIG. 8 is a back view of the invention shown in the closed position.
Figure 10:
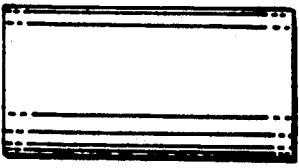
FIG. 10 is a bottom view of the invention shown in FIG. 9.

Referring to FIG. 1, closure device 2 is shown in the unbiased, open position. Closure device 2 has unitary construction formed with first arm 4 connected to second arm 6 in a one-piece device. First arm 4 has a hinge end 5 and free end 10. Second arm 6 has hinge end 7 and free end 11. First arm 4 and second arm 6 are connected together at a curved portion forming hinge 8. Hinge is made resilient to allow relative movement between first arm 4 and second arm 6 and has a smooth inner surface 9. In the preferred embodiment, closure device 2 is fabricated from a lightweight plastic material using conventional injection molding or extrusion molding techniques. Alternatively, closure device 2 could be fabricated from metal alloys, polymers, rubber or other suitable materials.

First arm 4 is formed having a convex bulge region 12 at free end 10. Convex bulge region 12 has a concave recessed channel 16 disposed across its width. First arm 4 defines flat inside wall 18 and is made having a thickness slightly greater than that of hinge 8. Second arm 6 comprises first section 20 and second section 22 separated by an angled junction region 24 which forms edge 26. First section 20 is tapered in thickness having an increasing thickness along the length of first section 20 as it extends from hinge 8 toward angled junction region 24. This feature allows second arm 6 to have increased rigidity at angled junction region 24.

Second section 22, forming free end 11 of second arm 6, angles away from first arm 4 at angled junction 24, then curves back towards first arm 4 thereby forming a flanged portion 32 which terminates at semi-circular lip 34. Lever 36 is formed on the outside external surface of curved end 30 and extends outwardly.

The invention has a natural, unbiased open position as shown in FIG. 1. The open position allows the article to be sealed by closure device 2 to be inserted between first arm 4 and second arm 6. To move the device in a closed position, first arm 4 and second arm 6 are forced together as indicated in FIG. 2 by arrows 44, 46. As convex bulge region 12 contacts lip 34, lip 34 rides up upon smooth curved outer surface 14 of free end 10 as shown by arrow 48 in FIG. 2. This action causes curved end 30 to deform by deflecting outwardly thereby allowing lip 34 to ride up upon the smooth curved outer surface 14 until shoulder 52 passes inside flange 32 and lip 34 engages concave recessed channel 16 and clips into a closed position as illustrated in FIG. 3.

FIG. 3 shows the invention in the closed, locked position. The natural bias of the invention causes first arm 4 to bias out and away from second arm 6. In the locked position, however, the natural bias is restrained by the engagement between lip 34 and concave recessed channel 16. This engagement locks the device 2 in a closed position. In the closed position, edge 26 approaches, but does not contact, inside wall 18 to provide suitable clearance for the article being sealed between first arm 4 and second arm 6 in clamping region 38. The slight angle of second arm 6 between hinge 8 and angled junction region 24 creates a wedge shaped clamping region 38 when the invention is in the closed position. This wedge shape helps to position the material being sealed toward hinge 8, between hinge 8 and angled junction region 24 to maximize clamping force. First arm 4 is made of sufficient thickness to minimize bowing or bulging which might compromise the connection between lip 34 and concave recessed channel 16 in the closed or locked position.

To move the closure device from a locked to unlocked position, force is applied to lever 36 as shown in FIG. 4 by arrow 50. This force deforms the curved end 30 of second arm 6 thereby deflecting and lifting lip 34 out of concave recessed channel 16 as indicated by arrow 49 to unlock the device from the closed position and allow the device to return to its natural, unbiased and open position.

In operation, an article to be closed or sealed, such as a plastic bag 54 as shown in FIG. 5, is first inserted between first arm 4 and second arm 6 when closure device 2 is in the open and unbiased position. Preferably, the neck 56 of plastic bag 54 is first gathered or twisted so that it can be positioned between the first arm 4 and second arm 6 such that it rests between hinge 8 and free end 10. Closure device 2 is then closed by forcing first arm 4 and second arm 6 together as previously described.

In the preferred embodiment, the size of closure device 2 is selected for the particular application such that when the device is in the closed position, the article 54 is gathered and disposed within the clamping region 38 between first arm 4 and second arm 6, thereby forming a fluid-resistant seal at neck 56 within clamping region 38. For example, a closure device having an overall length of approximately $\frac{1}{2}$ inch measured from the outer tip of lever 36 to the outer surface of hinge 8 would be suitable to seal a typical newspaper bag. The size of the closure device 2 could be increased or decreased appropriately depending upon the article being sealed in the particular application.

The unique construction of closure device 2, including the taper of first section 20 and edge 26, provides a secure clamping action upon the article being sealed. Edge 26 helps to pinch and secure the article between first arm 4 and second arm 6. The increased thickness of second arm 6 along taper portion 28 provides added rigidity to prevent excessive bowing of second arm 6 when clamping or sealing articles having large amounts of flexible material. The width of closure device 2 can also be varied depending upon the particular application. An increased width can be selected to provide a greater surface area to engage the article within clamping region 38.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and scope of the invention. The embodiment described in this description was selected to best explain the principles of the invention and its principal application to thereby enable others skilled in the art to best utilize the invention in various embodiments and with various modifications as suited to the particular purpose contemplated. For example, the size and/or thicknesses of the various portions of the closure device could be modified to suit the particular application. It is intended that the scope of the invention be defined by the claims appended hereto.

What is claimed is:

1. A one piece closure device for sealing rubber tubes, plastic bags, inflated balloons, or other flexible objects, comprising:

a first arm and a second arm, said first arm and said second arm each having a hinged end and a free end, said first arm and said second arm connected together at said hinged end by a resilient curved portion having a substantially smooth inner surface forming a hinge and having a natural, unbiased position wherein said free end of said first arm and free end of said second arm are separated forming an open position, said free end of said second arm formed having a curved flange portion terminating at a lip, said curved flange portion having an outer surface and an inner surface, said free end of said first arm formed having a bulged region, wherein when said first arm and said second arm are biased together and said bulged region is forced toward the inner surface of said flanged region, said first arm and said second arm secure together in a closed position with said bulge region clipped and retained within said flange region by said lip and the first arm and the second arm defining a clamping region therebetween; and a lever formed on said outside surface of said flange region and providing a means for deforming said flange region to pivot said lip away from said bulge region thereby allowing said hinge to return to its natural, unbiased position.

2. The closure device of claim 1, wherein said bulge region comprises a concave recessed channel adapted to conform with the curvature of said lip, said lip extending generally towards said curved portion.

3. The closure device of claim 1, wherein said second arm includes a first section and a second section, the first section being at least partially tapered in thickness and generally stiffer than the second section.

4. The closure device of claim 3, wherein said first arm is made thicker than said curved portion forming said hinge.

5. The closure device of claim 4, wherein said closure device is injection molded from a resilient plastic.

6. The closure device of claim 4, wherein said closure device is extrusion molded from a resilient plastic.

7. A closure device for sealing flexible members, such as rubber or plastic tubes, plastic bags, inflated balloons or similar objects, comprising:

a unitary body having a first arm and a second arm, said first arm and said second arm connected by a resilient curved portion forming a hinge biasing the first arm and the second arm away from one another to form an unbiased, open position;

said first arm having a free end formed with a convex bulge region, said convex bulge region having a smooth curved outer surface and a recessed concave channel formed generally perpendicular to the length of said first arm;

said second arm having a first section and a second section, said first section positioned between the hinge and the second section, said first section tapered such that the thickness of said first section increases from said hinge toward said second section, said second section being substantially curved and forming a flange which initially angles out away from said first arm and curves in towards said first arm before terminating at a rounded lip, said second section formed having an outwardly extending lever;

wherein when the first arm and the second arm are biased towards each other about said hinge, the convex bulge region engages the lip of the second section thereby deflecting said flange and biasing the lip in a direction generally away from said hinge and over said convex bulge region into the concave recessed channel to thereby securely lock said closure device in a closed position; and wherein said closure device can be disengaged from said closed position by applying a force about said outwardly extending lever to outwardly bias said flange section substantially away from the convex recessed channel thereby allowing the first arm and the second arm to return to the unbiased position.

8. The closure device of claim 7, wherein in the closed condition, the first arm and the second arm define a clamping region therebetween.

9. The closure device of claim 7, wherein said closure device is injection molded from a resilient plastic material.

10. The closure device of claim 7, wherein said closure device is extrusion molded from a resilient plastic material.

* * * * *